United States Patent [19]

Sieck

[11] 4,109,486
[45] Aug. 29, 1978

[54] HEATING SYSTEM

[76] Inventor: Charles A. Sieck, 2311 N. Front St., Harrisburg, Pa. 17110

[21] Appl. No.: 751,599

[22] Filed: Dec. 17, 1976

Related U.S. Application Data

[63] Continuation-in-part of Ser. No. 681,575, Apr. 29, 1976.

[51] Int. Cl.² ............................................. F25D 9/00
[52] U.S. Cl. ........................................ 62/402; 62/238; 62/427; 60/648; 60/682
[58] Field of Search .................... 62/86, 87, 401, 402, 62/427; 165/154; 418/266, 69; 417/319; 60/648, 682

[56] References Cited

U.S. PATENT DOCUMENTS

| Re. 17,998 | 3/1931 | Fleisher | 62/427 X |
|---|---|---|---|
| 2,486,034 | 10/1949 | Katzow | 62/87 |
| 2,703,561 | 3/1955 | Froelich | 62/402 X |
| 3,323,586 | 6/1967 | Burne | 165/154 |
| 3,428,242 | 2/1969 | Rannenberg | 62/402 X |
| 3,523,428 | 8/1970 | Nagyszalanczy | 62/402 |
| 3,956,904 | 5/1976 | Edwards | 62/402 |

OTHER PUBLICATIONS

Stoever, Herman J., "Engineering Thermodynamics," John Wiley & Sons, Inc., New York, 1956, pp. 176–177.

*Primary Examiner*—William E. Wayner
*Assistant Examiner*—William E. Tapolcai, Jr.
*Attorney, Agent, or Firm*—Frederick L. Bergert

[57] ABSTRACT

A heating system which includes a combination of a sliding vane compressor, a positive pressure combustor and a sliding vane expander is disclosed. The components of the present system have been found to operate together to permit full use of the B.T.U. value of fuel. In an alternative embodiment, the heating system uses heat extracted from the ambient air as the heat source. The system may also be operated as an air conditioning system, rejecting heat from the system to the ambient air.

4 Claims, 7 Drawing Figures

HEATING SYSTEM

BACKGROUND AND SUMMARY OF THE INVENTION

This is a continuation-in-part of application Ser. No. 681,575 filed Apr. 29, 1976.

The present invention is related to a heating system. More particularly, the present invention relates to a heating system which includes a combination of a sliding vane compressor, a positive pressure combustor and a sliding vane expander.

Various systems have been described in the prior art as providing efficient utilization of fuel in conventional heating systems. Such prior art systems have frequently been accompanied by disadvantages such as incomplete combustion and loss of considerable amounts of heat to the atmosphere.

By the present invention, there is provided a heating system which includes a sliding vane compressor, a positive pressure combustor and a sliding vane expander. The combination of these units, arranged as described hereinafter, has been found to permit full use of the B.T.U. value of fuel, whereas conventional heating systems often lose as much as 50% of their heat value through exhaust of hot gases to the atmosphere.

The present heating system may also be set up to operate with heat extracted from the ambient air as the heat source. In addition, the system may be operated as an air conditioning system, rejecting heat from the system to the ambient air.

BRIEF DESCRIPTION OF THE DRAWINGS

The advantages and features of the heating system of the present invention will be more clearly understood from the following description of the preferred embodiments, taken in conjunction with the accompanying drawings wherein.

DESCRIPTION OF THE PREFERRED EMBODIMENTS

Figure 1:
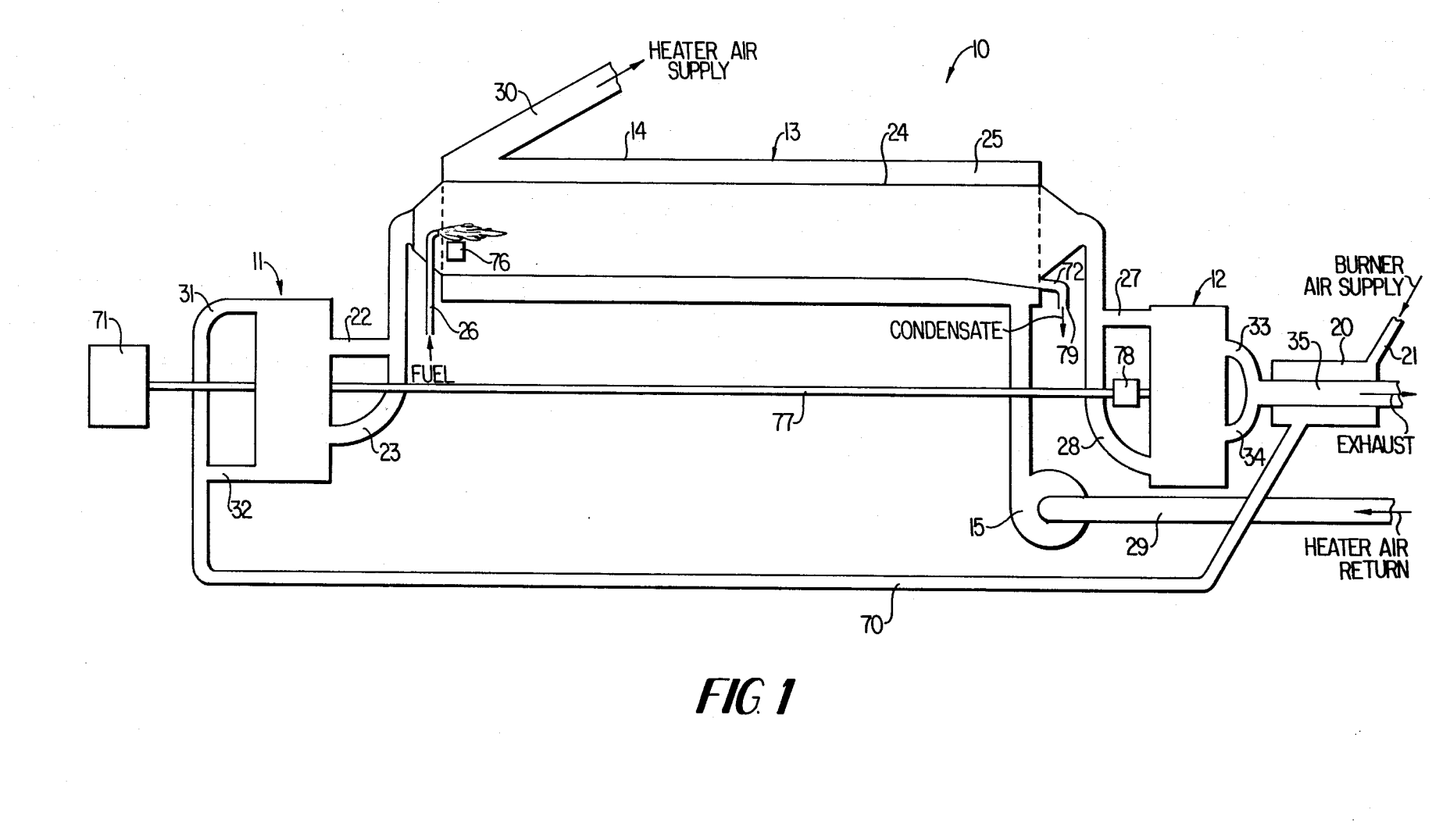
FIG. 1 is a schematic diagram of a heating system constructed in accordance with the present invention.
Figure 2:
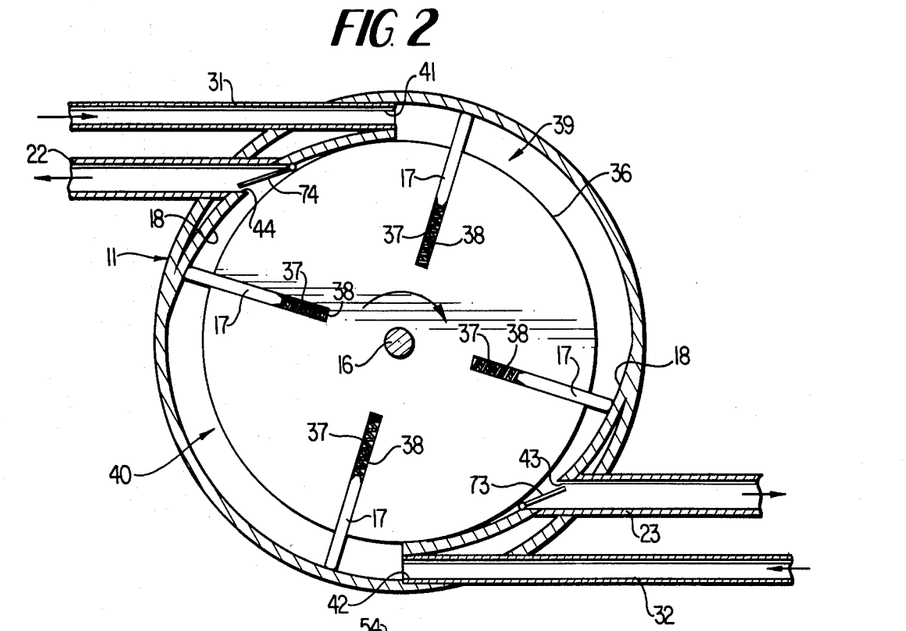
FIG. 2 is a cross-sectional elevational view of the improved sliding vane compressor of the present invention.
Figure 3:
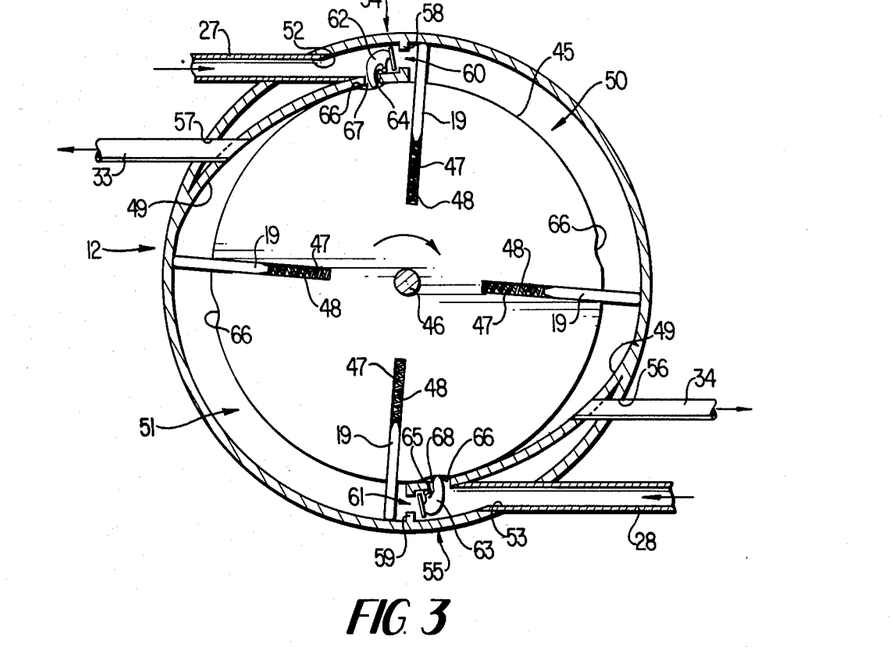
FIG. 3 is a cross-sectional elevational view of the improved sliding vane expander of the present invention.

In the embodiment of the present invention as shown in FIGS. 1 through 3, there is provided a heating system 10 which includes a sliding vane compressor 11, a sliding vane expander 12 and a positive pressure combustion apparatus 13.

As shown in detail in FIG. 2, the sliding vane compressor 11 includes a rotor 36 mounted on a shaft 16, the rotor 36 being provided with a plurality of generally radially extending, slidable vanes 17, said vanes 17 being biased outwardly by means such as springs 37 which are set into cavities 38 in the body of the rotor 36. Four such vanes 17 are shown in the drawings but this number could be varied, depending on the particular operating conditions. The cross-sectional views of the compressor 11 and expander 12, shown in FIGS. 2 and 3 respectively, illustrate the novel features of these components, with the mounting and other general construction features being conventional in the art to which the invention pertains.

A rotor housing 18 surrounds the rotor 36 of the compressor 11, and the housing 18 is provided with a generally cylindrically shaped chamber which is concentric with the rotor 36. The inner surface of the housing 18 which forms the chamber is constructed so as to slant inwardly in a curved or arcuate shape on opposite sides of the rotor 36 to a point where said inner surface engages the rotor 36 on opposite sides thereof, in order to prevent passage of compressed gas beyond said points. This inner surface of the housing 18 which engages the rotor 36 is machined to close tolerances and lubricated as necessary during operation.

Thus there are provided a pair of compression cavities 39, 40, each of which is crescent-shaped at one end thereof on opposite sides of the rotor 36, and with the other end surface of each cavity 39, 40 being generally perpendicular relative to the outer surface of the rotor 36 and having a suction port 41, 42 in each of said ends of the cavities 39, 40. At the extreme ends of the cresent-shaped end portions of each cavity 39, 40 there are provided discharge ports 43, 44. A regulator valve 73, 74 is provided at the entrance of each discharge port 43, 44 in order to control the pressure at which compressed air or other gas is released from the compression cavities 39, 40. These valves 73, 74 may be any of the conventional pressure-operated type which provide for opening the valve and passage of air out through the discharge port 43, 44 when a preset pressure has been exceeded.

The shaft 16 of the compressor 11 is connected to the shaft 46 of the expander 12 by a common shaft 77. Thus the shaft 16 is capable of being driven by the expander 12. In addition, an auxiliary starting motor 71 is provided for initial operation of the compressor 11. An idling gear 78, which may be of conventional construction, is positioned on the shaft 77 so that, as pressure builds up in the combustor 13, the expander 12 will speed up and engage the shaft 16 to drive the compressor 11.

Operation of the compressor 11 is obtained as force is applied to the shaft 16 which causes rotation in a clockwise direction. The sliding vanes 17 are alternately depressed and extended by the housing 18 during rotation. As rotation occurs, air is drawn by suction into the chambers or cavities 39, 40 where the air is compressed, after which the air is discharged through the regulator valves 73, 74 at a set pressure such as, for example, about 30 psia. In this compressor 11, incoming suction may occur at conditions including a temperature of about 60° F. and a pressure of about 15 psia, and with discharge at conditions including a temperature of about 174° F. and a pressure of about 30 psia. Volume at the input or suction may, for example, be about 12.83 ft³/lb. of the air and with discharge at about 7.82 ft³/lb. of air.

As shown in detail in FIG. 3, the construction of the sliding vane expander 12 is somewhat similar to that of the compressor 11, with the expander 12 including a rotor 45 mounted on a shaft 46 and the radially extending, slidable vanes 19 biased outwardly by means such as springs 47 which are set into cavities 48 in the body of the rotor 45. The relationship of the rotor housing 49 to the rotor 45 of the expander 12 is similar to that of the compressor 11, the inner surface of the housing 49 forming with the rotor 45 a pair of cavities 50, 51, each of which is crescent-shaped at one end portion. At the opposite end portion of each cavity 50, 51, there is provided an entrance port 52, 53 for discharge into the expander 12 of combustion gas from the combustor 13. A valve 54, 55 is provided adjacent the entrance port 52, 53 of each cavity 50, 51 to provide for control of the entering gas. At the extreme ends of the cresent-shaped end portions of each cavity 50, 51 there are provided discharge ports 56, 57.

Each valve 54, 55 includes a respective valve seat 58, 59 which extends completely across each cavity 50, 51. Each seat 58, 59 is provided with an opening 60, 61 for passage of air. A pivotable member 62, 63 is provided for sealing engagement with a respective opening 60, 61. The members 62, 63 are biased outwardly away from the openings 60, 61 and toward the rotor by means such as a spring 64, 65. Each spring 64, 65 is attached at its lower end to the inner end portion of the housing 49 on opposite sides of the rotor 45. Recesses 66 are provided at 90 degree intervals on the periphery of the rotor 45, said recesses being aligned with a respective opening 67, 68 in the housing 49 adjacent each spring 64, 65. Due to this construction, it will be seen that, as the rotor 45 rotates, at 90° intervals a recess 66 will become aligned with an opening 67, 68 with the result that the lower end of a pivotable member 62, 63 will be biased into said one of said recessed 66 due to the action of springs 64, 65. As this occurs, the opposite end of the members 62, 63 will move away from the openings 60, 61, thus allowing combustion gases to enter the cavities 50, 51. The slope of the walls of the recesses 66 is such that the member 62, 63 will ride smoothly into and out of the recesses 66.

It is to be noted that the recesses 66 occur after a respective vane 19 and are so positioned that, when a vane 19 is in position to accept gases for expansion, the valves 54, 55 will open.

In the operation of the expander 12, combustion gas enters through valves 54, 55 at conditions which may include a pressure of about 30 psia and a temperature of about 174° F., exerting a force on the sliding vanes 19 which causes rotation by expansion of the gas. The expanded gas is then exhausted at discharge ports 56, 57 at conditions such as a pressure of about 15 psia and a temperature of about 60° F. A rotational force is exerted on the shaft 46 by the expanding gas.

In the case of both the compressor 11 and expander 12, the number of compression or expansion cavities may be varied from the two cavities shown in FIGS. 2 and 3. The most efficient operation occurs when the number of such cavities is equal to one-half the number of vanes.

As shown in FIG. 1, in the present heating system 10 the sliding vane compressor 11 discharges through compressed air conduits 22, 23 to combustion apparatus 13. The combustion apparatus 13 includes an outer case 14 and a liner or flame tube 24, the line 24 being concentrically enclosed within and spaced from the outer case 14 to create an annular chamber 25 in which heat exchange conditions are provided for an air supply which passes between the liner 24 and the case 14 in a countercurrent direction relative to the flow of combustion gases within the liner 24. While air is used as an example, it should be understood that other gases, liquids or steam generation can be utilized in the chamber 25.

A fuel inlet means is provided for introducing a stream of fuel into the upstream end portion of the liner 24. As illustrated in FIG. 1, the fuel inlet means includes a hollow conduit 26 for introducing a stream of fuel into the liner 24 axially with respect to the air stream. Any other suitable fuel inlet means may be employed. A burner 76 for igniting the fuel is provided adjacent the fuel inlet 26.

The liner 24 is of generally conventional construction, having air inlet conduits 22, 23 at its upstream end for passage thereinto of compressed air from the compressor 11, and with air outlet conduits 27, 28 which lead from the downstream end of the liner 24 to the expander 12. As the combustion gases pass the length of the liner 24, heat is transferred through the walls of the liner 24 to the air passing through the annular chamber 25 in a countercurrent direction relative to the flow of combustion gases within the liner 24. As shown in FIG. 1, the temperature of the combustion gases may initially be at a temperature of about 600° F., for example, with the temperature being successively reduced as the gases pass down the length of the liner 24, and with the gases exiting from the liner 24 at a temperature of about 174° F., for example. Condensate is collected at port 72 in the liner 24 and is drawn off by means such as a float valve 79.

Supply air for the compressor 11 and combustion apparatus 13, such air being hereinafter referred to as "burner supply air," enters the system 10 through port 21 at atmospheric pressure and a temperature such as, for example, about 40° F. The burner supply air passes through a heat exchanger 20 in heat exchange relationship with exhaust air from the expander 12, as described in more detail hereinafter, which increases the temperature of the burner supply air to a temperature such as, for example, about 60° F. From the heat exchanger 20, the burner supply air passes through a suitable conduit 70 to the sliding vane compressor 11, with the air entering the compressor 11 through conduits 31, 32 which are spaced 180° apart on the periphery of the compressor 11, as shown in FIG. 2.

The burner supply air then passes through the compressor 11 and the combustion apparatus 13 where combustion takes place resulting in the combustion gas which drives the expander 12. Combustion gas is exhausted from the sliding vane expander 12 through conduits 33, 34 which lead into a common conduit 35 which forms the central portion of heat exchanger 20, so that heat may be transferred in a conventional manner to burner supply air entering the system through port 21. The combustion gas is then exhausted to the atmosphere at a reduced temperature such as about 40° F.

The temperatures mentioned in connection with the compressor 11, the expander 12 and the combustor 13 are the preferred operating temperatures for the present heating system 10. Thus, considering air at an ambient temperature of 40° F. in an industrial or residential environment, such air will be heated in the heat exchanger 20 to a temperature of about 60° F. Such preheated air is then compressed to 30 psia in the compressor 11, and the temperature of the air becomes 174° F. upon compression. In the combustor 13 the fuel rate is preferably adjusted relative to the rate of compressed air from the compressor 11 to develop combustion gases at 600° F. at the pressure of 30 psia. Also, the rate of blower air at 70° F. is adjusted to transfer heat to the blower air from the combustor 11 so that downstream the combustor gas is at 174° F. as it enters the expander 12. The expander 12, operating on input gas at a temperature of 174° F. and a pressure of 30 psia, will produce a force approximately equal to that required to drive the compressor 11. Exhaust gases from the expander 12 will then be at a temperature of 60° F. and a pressure of 15 psia. By employing these relatively moderate conditions in the present system 10, the high temperatures such as are found in turbine operation are effectively avoided, thus avoiding the production of nitrous oxides. Such temperatures are regulated primarily by the rate of fuel, the rate of compressed air and the rate of blower air, as well as by the temperature of the return air coming back into the system 10.

The heat exchanger 20 may be of any suitable type such as, for example, a rotary regenerator or a fixed recuperator. As employed in the present invention, its purpose is to preheat the burner supply air which is entering the system by the use of heat from the combustion air which has been exhausted from the sliding vane expander 12.

The air supply which passes into chamber 25 at the downstream end of the liner 24 is provided from the heat duct system (not shown) or other equipment which makes use of the air which has been heated by the present apparatus 10. The air passes into the chamber 25 from an air return conduit 29 which initially conducts the air supply through a suitable blower 15. Afer passing through the chamber 25, the air supply passes into an air supply conduit 30 at the upstream end of the liner 24 for delivery to the heat duct system in which the heated air supply will be employed. As an example of conditions which may be provided by the present invention, the air supply may return to the present apparatus 10 from the heat duct system through conduit 29 at a temperature of about 70° F. and a pressure of about 15 psia, and pass from the present apparatus 10 into the conduit 30 leading to the heat duct system at a temperature of about 90° F. and a pressure of about 15 psia.

During initial operation, the compressor 11, driven by an auxiliary starting motor 71, compresses the burner supply air to a pressure such as about 30 psia and with a temperature increase up to a temperature such as about 174° F. The compressed air from the compressor 11 is next combined with the fuel and ignited in the combustion apparatus 13. The rate of air and fuel is adjusted to deliver combustion gas at a high temperature, such as about 600° F. The combustion gas heat is transferred to the heating medium such as a supply of air in the chamber 25. Condensate is collected from the cooled combustion gas.

Figure 4:
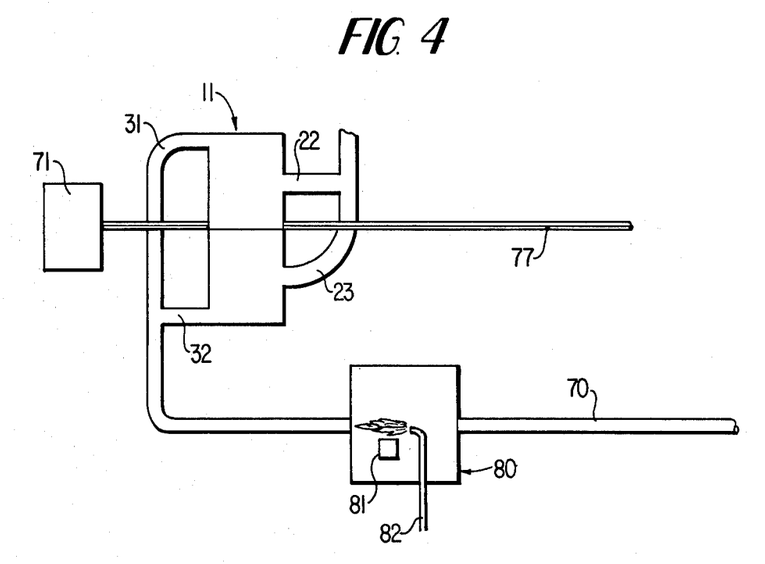
FIG. 4 is a partial schematic diagram of a second embodiment of the heating system of the present invention.

In an alternative embodiment, as shown in FIG. 4, the burner supply air which passes through conduit 70 is subjected to heating in a chamber 80 by a burner 81 of conventional type, and with a source of fuel being provided to the burner 81 through fuel inlet line 82. In this manner, the burner supply air may be heated to a temperature such as about 400° F. immediately before passing into the compressor 11.

Figure 5:
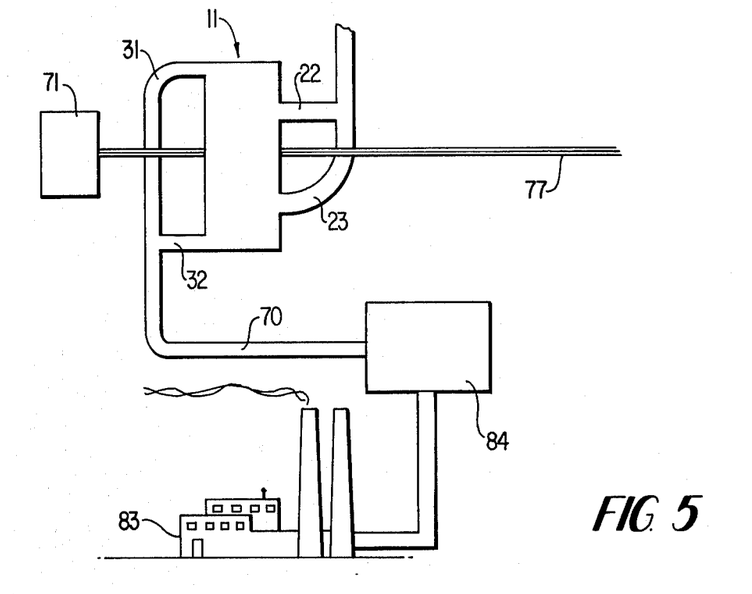
FIG. 5 is a partial schematic diagram of a third embodiment of the heating system of the present invention.

In FIG. 5 there is shown a further embodiment in which the input gas to the compressor 11 is made up of exhaust gases from a conventional heating plant 83, rather than from a source as shown in FIG. 1. These exhaust gases may pass into exhaust chamber 84 prior to passing into the compressor 11, and the exhaust gases may be at a temperature such as about 400° F. immediately before passing into the compressor 11. In this manner, heat which would otherwise be lost from the conventional heating plant 83 is utilized in operating the heating system 10 of the present invention.

In the use of the apparatus shown in either FIG. 4 or FIG. 5, the gas entering the compressor 11 may be at a temperature of about 400° F., and at a pressure of about 15 psia. The remainder of the heating system 10 may then be as shown in FIG. 1, except that the burner 76 and fuel inlet 26 in the combustor 13 are not utilized.

Considering inlet gas to the compressor 11 at a temperature of about 400° F. and a pressure of about 15 psia, the gas is compressed and exits from the compressor 11 into the liner 24 at a temperature of about 600° F. and a pressure of about 30 psia. The gas then passes the length of the liner 24 and exits from the liner 24 into the expander 12 at a temperature of about 174° F. and a pressure of about 30 psia. The gas is then exhausted from the expander 12 at a temperature of about 60° F. and a pressure of about 15 psia.

The combination of the units as described above has been found to permit the full use of the B.T.U. value of the fuel without having heat discharged back to the atmosphere, as distinguished from conventional heating systems which have been found to lose up to approximately 50% of their heat value through exhaust of hot gases to the atmosphere.

Figure 6:
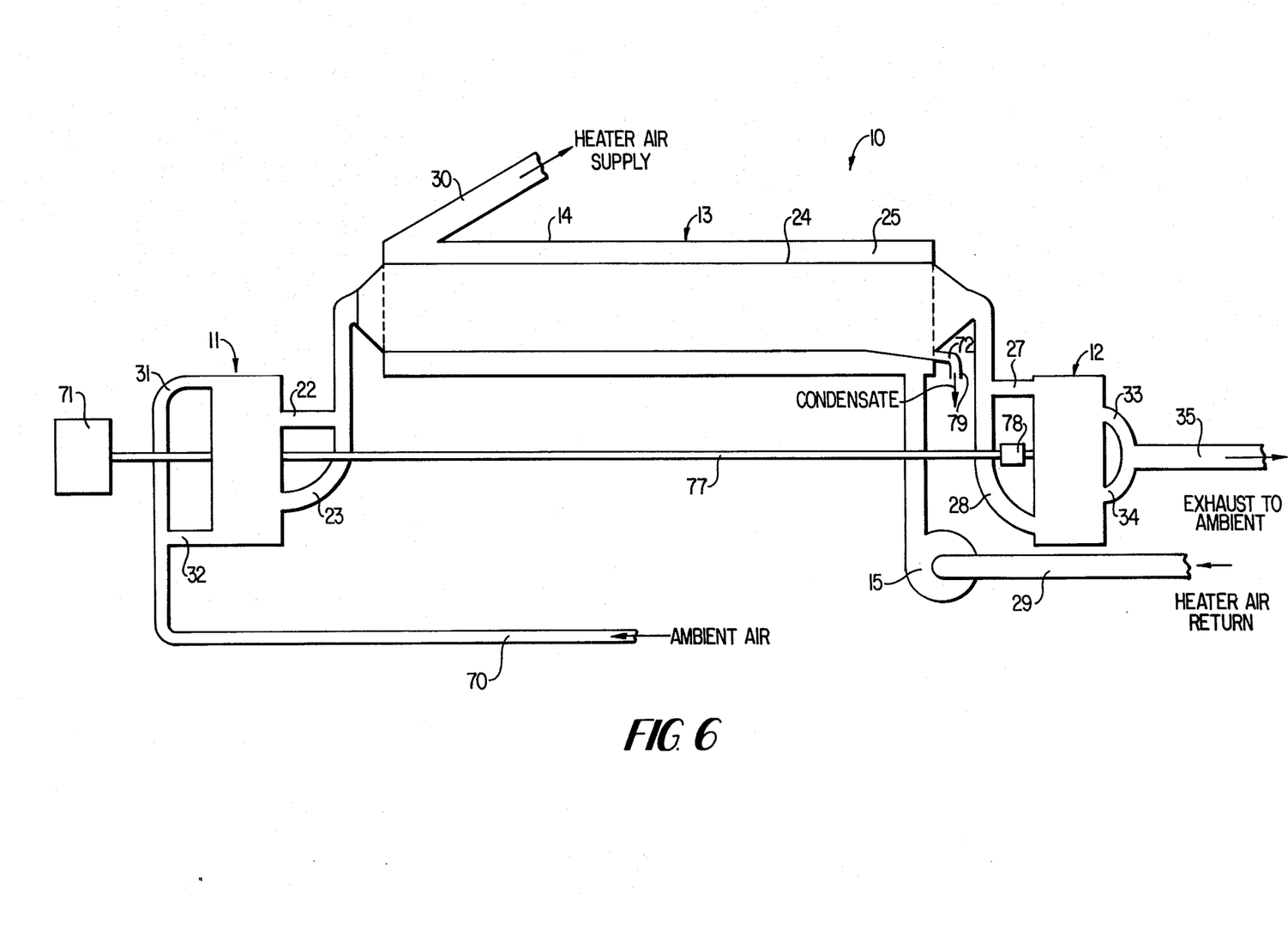
FIG. 6 is a schematic diagram of a fourth embodiment of the present invention.

The heating system of the present invention may also be set up to operate with heat extracted from the ambient air as the heat source. In such an embodiment of a heat system for use in extracting B.T.U.s from ambient air for home heating, reference is made to apparatus such as that shown in FIG. 6. In this embodiment, the combustor 13 serves as a pressure chamber. With reference to FIG. 6, ambient air, taken at a temperature and pressure such as, for example, 30° F. and 15 psia, enters the isentropic compressor 11. The air is discharged from the compressor 11 into the pressure chamber 13 at a temperature of about 137° F. and a pressure of about 30 psia. As the air passes the length of the chamber 13 within the liner 24 in heat exchange conditions with air located within chamber 25, heat is extracted from the air within the liner 24, lowering this air from a temperature of 137° F. to a temperature of about 70° F., with the pressure remaining constant at about 30 psia. The air from the liner 24, at a temperature of about 70° F. and a pressure of about 30 psia, then enters the isentropic expander 12. The expander 12 exhausts the air to the ambient at a temperature of about −25° F. and a pressure of about 15 psia. The return air from the house heating duct, for example, enters the chamber 25 at a temperature of about 70° F. and, as a result of passing through the chamber 25 under heat exchange conditions, the supply air to the house heating system leaves the chamber 25 at a temperature of about 110° F.

Using the temperature and pressure conditions as described above in connection with the embodiment of FIG. 6, the work, $W_C$, of the compressor can be calculated to be 25.67 B.T.U.s. Similarly, the work, $W_E$, of the expander is calculated as 23.0 B.T.U.s. The net work, $W_{Net}$, which is equal to $W_C - W_E$, is then 2.67 B.T.U.s. $W_{Net}$ input required by the operation is provided by motor 71.

With regard to the heat extracted from the air passing through the chamber 13 within the liner 24, this heat, Q out, may be calculated to be 16.08 B.T.U. per lb. of air passing through the liner 24. The coefficient of performance, C.O.P., is then (Q out/Wnet) = (16.08/2.67) = 6.02.

Considering a house of 1500 sq. ft. floor area as requiring 500 B.T.U. per minute, it is then seen that 500/16.08 = 31 lb. air per minute are required to pass through the system in order to heat the interior of the 1500 sq. ft. house, with the conditions as before described.

It can be stated as a general rule, at least in the northeastern part of the United States, that the cost of one B.T.U. produced electrically is three times the cost of a B.T.U. produced by fuel. Thus a C.O.P., coefficient of performance, of 3:1 would provide a break even point so far as the use of electrically produced heat compared to heat produced through combustion of fuel oil. However, as is seen from the above calculation, in this embodiment of the present invention, with a calculated C.O.P. of 6:1, the present electrical method would provide a saving of one-half the cost of using fuel oil in a conventional burner.

In the embodiment of FIG. 6, it is seen that, with an increase in pressure at the output of the compressor 11, up to 60 psia, for example, with consequent higher pressure air being transferred into the chamber 13, more B.T.U.s can be extracted from each pound of air passing through the chamber 13, but that the efficiency or coefficient of performance is thereby lowered. Such a situation would be likely during periods of colder weather. On the other hand, if the pressure at the output of the compressor 11 is reduced to a value less than 30 psia, then a more efficient process would result. This latter situation would be likely during periods of warmer weather, such as when the ambient temperature was 40° F. for example.

Figure 7:
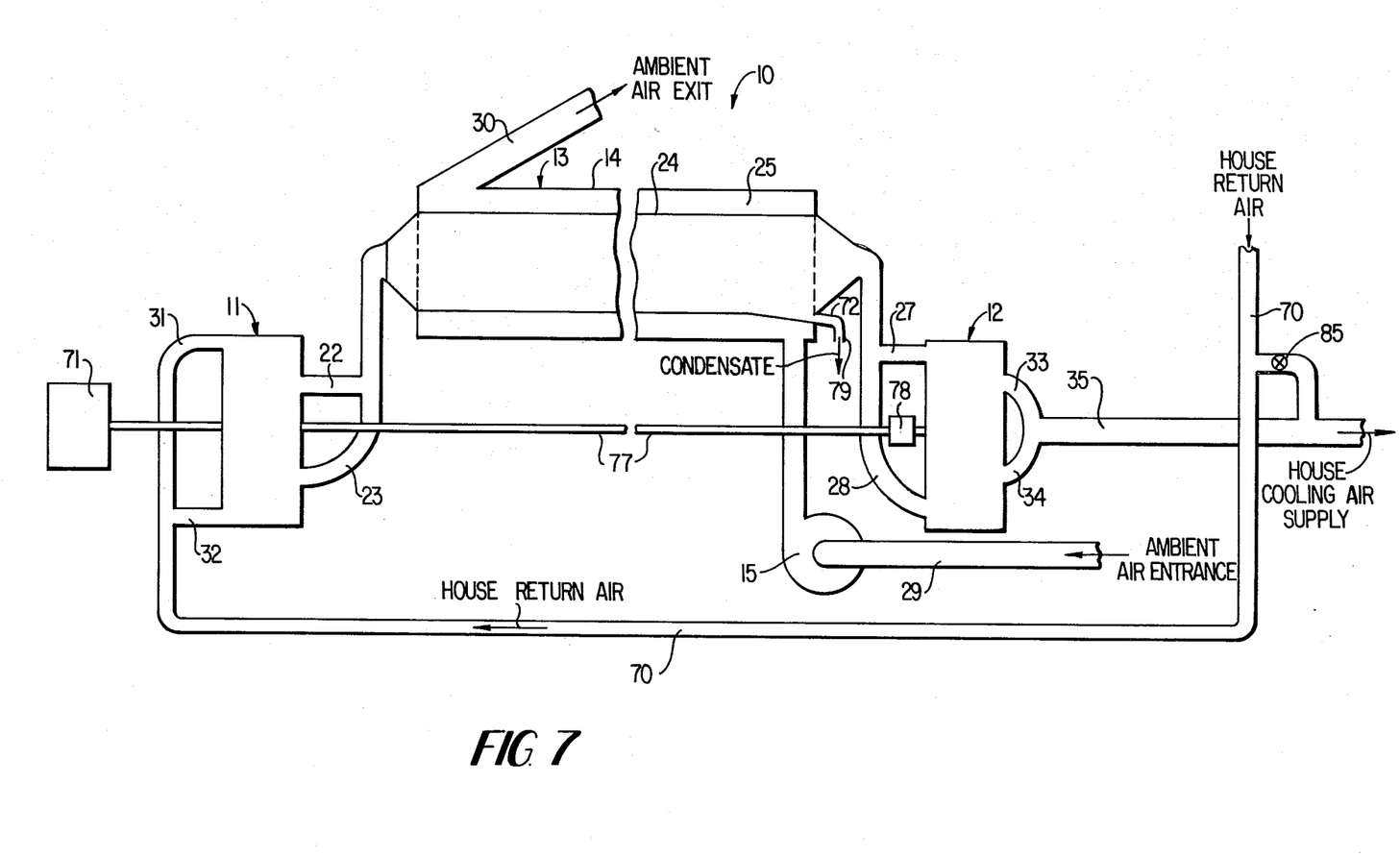
FIG. 7 is a schematic diagram of a fifth embodiment of the present invention.

A system similar to that previously described may be employed as an air conditioning system for summer cooling. Referring to FIG. 7, in such an embodiment, ambient air, at a temperature of about 100° F. and a pressure of about 15 psia may be employed, for example. The return air from the house enters the isentropic compressor 11 through conduit 70 at a temperature of about 75° F., for example. The compressor 11 discharges the air at a temperature of about 192° F. and a pressure of about 30 psia to the pressure chamber 13. As a result of passing through chamber 13, heat is removed from the air, reducing the temperature to about 100° F. with the pressure remaining constant at about 30 psia. This air, at about 100° F. and 30 psia pressure, then enters the isentropic expander 12.

The expander 12 discharges the air for house cooling at a temperature of about 0° F. and a pressure of about 15 psia. This air may then be blended with a portion of the return air to provide the desired temperature, such as by use of a valve 85. The ambient air which is taken in at a temperature of about 100° F., for example, enters the heat exchanger chamber 25. This air then leaves the chamber 25 to return to the ambient air at a temperature of about 192° F.

By varying the pressure within the pressure chamber 13, compensation may be made for changes in the ambient temperature and the temperature requirements within the house.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely the preferred embodiments thereof.

It is claimed:

1. A heating system which operates with heat extracted from the ambient air, comprising: a compressor having a rotor which rotates about a shaft; an auxiliary motor attached to said compressor to assist in driving said compressor; an expander having a rotor which rotates about a shaft, the shaft of the compressor being connected to the shaft of the expander by a common shaft to allow the shaft of the compressor to be driven by the expander; a heat exchange liner apparatus in fluid communication between said compressor and expander, said heat exchange liner apparatus including an outer case and an inner concentrically mounted liner which together provide an annular chamber therebetween, said annular chamber being in heat exchange relation with said liner; an inlet air conduit including means for providing ambient air to the inlet side of said compressor; and means for passing air through said annular chamber in heat exchange relationship with said heat exchange liner apparatus, wherein said compressor comprises a generally cylindrical rotor, said compressor rotor being provided with a plurality of generally radially extending, slidable vanes; a rotor housing surrounding said compressor rotor and having a generally cylindrically shaped chamber which is concentric with said compressor rotor, the inner surface of said chamber slanting inwardly on opposite sides of said compressor rotor to a point where the inner surface of the chamber is closely adjacent to said compressor rotor on opposite sides of said compressor rotor to provide a pair of compression cavities, each of which is crescent-shaped at one end thereof, on opposite sides of said compressor rotor, the inner surface of said chamber being engaged by said vanes, said vanes being biased outwardly against the inner surface of said chamber; a suction port and a discharge port for each of said compression cavities, each discharge port being located in the crescent-shaped end of its respective cavity and with each suction port being located at the opposite end of its respective cavity, each discharge port having valve means for allowing discharge of gas from said respective cavity at a predetermined pressure.

2. An air conditioning system which operates so that heat is provided to the ambient air, comprising: a compressor having a rotor which rotates about a shaft; an auxiliary motor attached to said compressor to assist in driving said compressor; an expander having a rotor which rotates about a shaft, the shaft of the compressor being connected to the shaft of the expander by a common shaft to allow the shaft of the compressor to be driven by the expander; an exhaust conduit connected to the outlet of said expander; a heat exchange liner apparatus in fluid communication between said compressor and expander, said heat exchange liner apparatus including an outer case and an inner concentrically mounted liner which together provide an annular chamber therebetween, said annular chamber being in heat exchange relation with said liner; an inlet air conduit including means for providing return air to the compressor from the space being cooled, said inlet air conduit including a conduit connected between said inlet air conduit and the exhaust conduit from said expander; valve means located in said connecting conduit for controlling the flow of air from said inlet air conduit to said expander exhaust conduit; and means for passing ambient air through said annular chamber in heat exchange relationship with said heat exchange liner apparatus, wherein said compressor comprises a generally cylindrical rotor, said compressor rotor being provided with a plurality of generally radially extending, slidable vanes; a rotor housing surrounding said compressor rotor and having a generally cylindrically shaped chamber which is concentric with said compressor rotor, the inner surface of said chamber slanting inwardly on opposite sides of said compressor rotor to a point where the inner surface of the chamber is closely adjacent to said compressor rotor on opposite sides of said compressor rotor to provide a pair of compression cavities, each of which is crescent-shaped at one end thereof, on opposite sides of said compressor rotor, the inner surface of said chamber being engaged by said vanes, said vanes being biased outwardly against the inner surface of said chamber; a suction port and a discharge port for each of said compression cavities, each discharge port being located in the crescent-shaped end of its respective cavity and with each suction port being located at the opposite end of its respective cavity, each discharge port having valve means for allowing discharge of gas from said respective cavity at a predetermined pressure.

3. A heating system which operates with heat extracted from the ambient air, comprising: a compressor having a rotor which rotates about a shaft; an auxiliary motor attached to said compressor to assist in driving said compressor; an expander having a rotor which rotates about a shaft, the shaft of the compressor being connected to the shaft of the expander by a common shaft to allow the shaft of the compressor to be driven by the expander; a heat exchange liner apparatus in fluid communication between said compressor and expander, said heat exchange liner apparatus including an outer case and an inner concentrically mounted liner which together provide an annular chamber therebetween, said annular chamber being in heat exchange relation with said liner; an inlet air conduit including means for providing ambient air to the inlet side of said compressor; and means for passing air through said annular chamber in heat exchange relationship with said heat exchange liner apparatus, wherein said expander comprises a generally cylindrical rotor, said expander rotor being provided with a plurality of generally radially extending, slidable vanes; a rotor housing surrounding said expander rotor and having a generally cylindrically shaped chamber which is concentric with said expander rotor, the inner surface of said chamber slanting inwardly on opposite sides of said expander rotor to a point where the inner surface of the chamber is closely adjacent to said expander rotor on opposite sides of said expander rotor to provide a pair of expansion cavities, each of which is crescent-shaped at one end thereof, on opposite sides of said expander rotor, the inner surface of said chamber being engaged by said vanes, said vanes being biased outwardly against the inner surface of said chamber; a suction port and a discharge port for each of said expansion cavities, each discharge port being located in the crescent-shaped end of its respective cavity and with each suction port being located at the opposite end of its respective cavity, each discharge port having valve means for allowing discharge of gas from said respective cavity at a predetermined pressure; each suction port being provided with a valve having means for opening and closing said valve in relationship to a predetermined position of said expander rotor.

4. An air conditioning system which operates so that heat is provided to the ambient air, comprising: a compressor having a rotor which rotates about a shaft; an auxiliary motor attached to said compressor to assist in driving said compressor; an expander having a rotor which rotates about a shaft, the shaft of the compressor being connected to the shaft of the expander by a common shaft to allow the shaft of the compressor to be driven by the expander; an exhaust conduit connected to the outlet of said expander; a heat exchange liner apparatus in fluid communication between said compressor and expander, said heat exchange liner apparatus including an outer case and an inner concentrically mounted liner which together provide an annular chamber being in heat exchange relation with said liner; an inlet air conduit including means for providing return air to the compressor from the space being cooled, said inlet air conduit including a conduit connected between said inlet air conduit and the exhaust conduit from said expander; valve means located in said connecting conduit for controlling the flow of air from said inlet air conduit to said expander exhaust conduit; and means for passing ambient air through said annular chamber in heat exchange relationship with said heat exchange liner apparatus, wherein said expander comprises a generally cylindrical rotor, said expander rotor being provided with a plurality of generally radially extending, slidable vanes; a rotor housing surrounding said expander rotor and having a generally cylindrically shaped chamber which is concentric with said expander rotor, the inner surface of said chamber slanting inwardly on opposite sides of said expander rotor to a point where the inner surface of the chamber is closely adjacent to said expander rotor on opposite sides of said expander rotor to provide a pair of expansion cavities, each of which is crescent-shaped at one end thereof, on opposite sides of said expander rotor, the inner surface of said chamber being engaged by said vanes, said vanes being biased outwardly against the inner surface of said chamber; a suction port and a discharge port for each of said expansion cavities, each discharge port being located in the cresent-shaped end of its respective cavity and with each suction port being located at the opposite end of its respective cavity, each discharge port having valve means for allowing discharge of gas from said respective cavity at a predetermined pressure; each suction port being provided with a valve having means for opening and closing said valve in relationship to a predetermined position of said expander rotor.

* * * * *